(12) United States Patent
Lahr et al.

(10) Patent No.: US 11,545,860 B2
(45) Date of Patent: Jan. 3, 2023

(54) INSERTS FOR MOTOR ROTOR CORE

(71) Applicant: GM Global Technology Operations LLC, Detroit, MI (US)

(72) Inventors: Derek F. Lahr, Howell, MI (US); Alireza Fatemi, Canton, MI (US); Farzad Sarnie, Franklin, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 17/181,193

(22) Filed: Feb. 22, 2021

(65) Prior Publication Data
US 2022/0271583 A1    Aug. 25, 2022

(51) Int. Cl.
*H02K 1/27*    (2022.01)
*H02K 1/276*    (2022.01)

(52) U.S. Cl.
CPC .................. *H02K 1/2766* (2013.01)

(58) Field of Classification Search
CPC .............................. H02K 1/2766; Y02T 10/64
See application file for complete search history.

(56) References Cited

U.S. PATENT DOCUMENTS

| | | | |
|---|---|---|---|
| 5,889,342 A | 3/1999 | Hasebe et al. | |
| 7,705,503 B2 | 4/2010 | Takahashi et al. | |
| 9,030,062 B2 | 5/2015 | Matsumoto | |
| 9,041,261 B2 | 5/2015 | Yamamoto et al. | |
| 9,806,572 B2 | 10/2017 | Yamagishi et al. | |
| 10,116,178 B2 | 10/2018 | Horii et al. | |
| 2004/0217666 A1 | 11/2004 | Mellor et al. | |
| 2012/0299403 A1 | 11/2012 | Stahlhut et al. | |
| 2013/0020889 A1 | 1/2013 | Yamamoto et al. | |
| 2013/0026871 A1* | 1/2013 | Van Dam | H02K 1/2766 310/156.08 |
| 2013/0313923 A1 | 11/2013 | Hamer et al. | |
| 2013/0334910 A1 | 12/2013 | Takahashi et al. | |
| 2014/0028139 A1 | 1/2014 | Hamer et al. | |
| 2014/0070637 A1 | 3/2014 | Hamer et al. | |
| 2016/0036276 A1 | 2/2016 | Yamagishi et al. | |
| 2016/0134163 A1* | 5/2016 | Hamanaka | H02K 1/2766 310/156.53 |
| 2016/0226326 A1* | 8/2016 | Gotschmann | H02K 1/2766 |
| 2016/0261158 A1 | 9/2016 | Horii et al. | |

(Continued)

FOREIGN PATENT DOCUMENTS

JP    2010193660 A    *    9/2010

*Primary Examiner* — Thomas Truong
(74) *Attorney, Agent, or Firm* — Vivacqua Crane, PLLC

(57) ABSTRACT

A rotor core for an electric motor includes a core stack including a plurality of lamination plates, each lamination plate including a plurality of apertures formed therein, the plurality of apertures of each of the lamination plates axially aligned and defining a plurality of axial magnet slots extending through the core stack and adapted to support a plurality of permanent magnets therein, and at least one insert extending axially through the core stack and adapted to provide radial structural stability to the plurality of lamination plates to prevent portions of the plurality of lamination plates adjacent the plurality of magnet slots from flexing due to radial forces exerted on the plurality of lamination plates during operation of the electric motor.

19 Claims, 9 Drawing Sheets

(56) References Cited

U.S. PATENT DOCUMENTS

| | | | |
|---|---|---|---|
| 2016/0294262 A1* | 10/2016 | Yomoda | ................. H02K 15/03 |
| 2017/0155292 A1 | 6/2017 | Kimura et al. | |
| 2018/0375395 A1 | 12/2018 | Yamagishi | |
| 2019/0238017 A1 | 8/2019 | Ohira | |

* cited by examiner

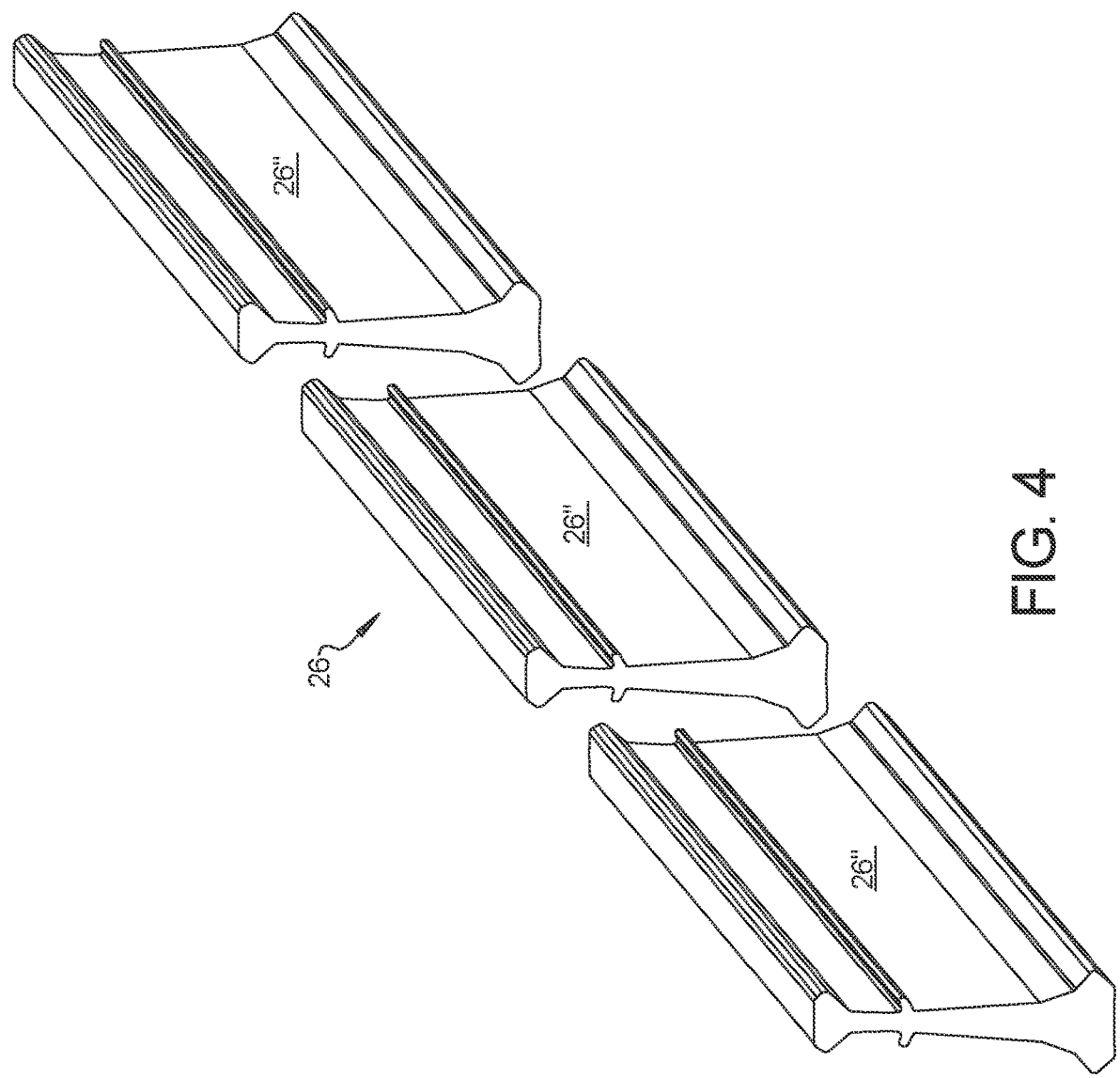

INSERTS FOR MOTOR ROTOR CORE

INTRODUCTION

The present disclosure relates to a rotor core for an electric machine within an automobile.

An electric machine functions as a motor by utilizing electrical energy to produce mechanical torque through the interaction of rotor magnetic fields and stator fields produced by electric current-carrying conductors. Some electric motors may also function as generators by using torque to produce electrical energy. An electric machine such as an interior permanent magnet machine or a synchronous machine has a rotor assembly that includes a rotor core with magnets of alternating polarity spaced around the rotor core. Some rotor cores define slots that act as barrier layers for magnetic fields. Some of the slots may contain the magnets.

Stress levels in a rotor core due to centrifugal force are often highest at a web or at a bridge of the rotor core. Increasing the thickness of the web or bridge or increasing the arc radius of the slot that partially defines the web or bridge may reduce such stress, but not without a torque reduction due to increased flux leakage. Selective heat treatment of portions of stainless steel lamination plates that make up the rotor core can provide additional strength without the corresponding torque reduction due to flux leakage and a reduction in permeability. This translates to an increase in torque, or strength through an increase in cross section with no penalty in torque/flux leakage, because they are now impermeable. However such methods are expensive and add significant cost to the rotor.

Thus, while current rotor cores achieve their intended purpose, there is a need for a new and improved rotor core with structural integrity sufficient to withstand centrifugal forces during use of the electric machine without reducing torque due to increased flux leakage.

SUMMARY

According to several aspects of the present disclosure, a rotor core for an electric machine of an automobile includes a core stack including a plurality of nearly identical lamination plates, each lamination plate including a plurality of apertures formed therein, the plurality of apertures of each of the lamination plates axially aligned and defining a plurality of axial magnet slots extending through the core stack and adapted to support a plurality of permanent magnets therein, and at least one insert extending axially through the core stack and adapted to provide radial structural stability to the plurality of lamination plates to prevent portions of the plurality of lamination plates adjacent the plurality of magnet slots from flexing due to radial forces exerted on the plurality of lamination plates during operation of the electric motor.

According to another aspect, each of the at least one insert comprises a single beam extending axially along an entire length of the core stack.

According to another aspect, each of the at least one insert comprises a plurality of beam segments axially aligned and extending axially along an entire length of the core stack, each beam segment extending through a portion of the plurality of lamination plates.

According to another aspect, each of the at least one insert comprises a plurality of beam slices axially aligned and extending axially along an entire length of the core stack, one beam slice of each of the at least one insert positioned within each one of the plurality of lamination plates.

According to another aspect, each of the at least one insert is formed entirely from a ferrous material.

According to another aspect, each of the at least one insert includes portions formed from a ferrous material and portions formed from an austenitic material.

According to another aspect, the austenitic portions of each of the at least one insert are positioned between adjacent magnet slots within the core stack.

According to another aspect, each of the at least one insert is formed entirely from an non-ferrous material.

According to another aspect, each of the at least one insert extends radially between an inner diameter of the core stack and an outer diameter of the core stack, each of the plurality of lamination plates comprising a plurality of pie shaped radial segments positioned between adjacent pairs of the at least one insert.

According to another aspect, each of the plurality of lamination plates is a single piece and includes at least one radial slot, one of the at least one insert being positioned within each one of the at least one radial slot.

According to another aspect, each of the at least one insert is adapted to provide a compressive pre-load onto the core stack to act against radial forces experienced by portions of the plurality of lamination plates adjacent the plurality of magnet slots during operation of the rotor.

According to another aspect, each of the at least one insert is one of press fit and shrink fit within the plurality of lamination plates.

According to another aspect, each of the at least one insert extends radially inward and engages a rotor shaft extending axially through the core stack.

According to another aspect, each of the at least one insert includes features adapted to engage radial outward portions of the plurality of lamination plates adjacent the plurality of magnet slots to radial support the portions of the plurality of lamination plates adjacent the plurality of magnet slots during operation of the rotor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a perspective view of an insert including beam segments according to another exemplary embodiment;

DETAILED DESCRIPTION

The following description is merely exemplary in nature and is not intended to limit the present disclosure, application, or uses.

Figure 1:
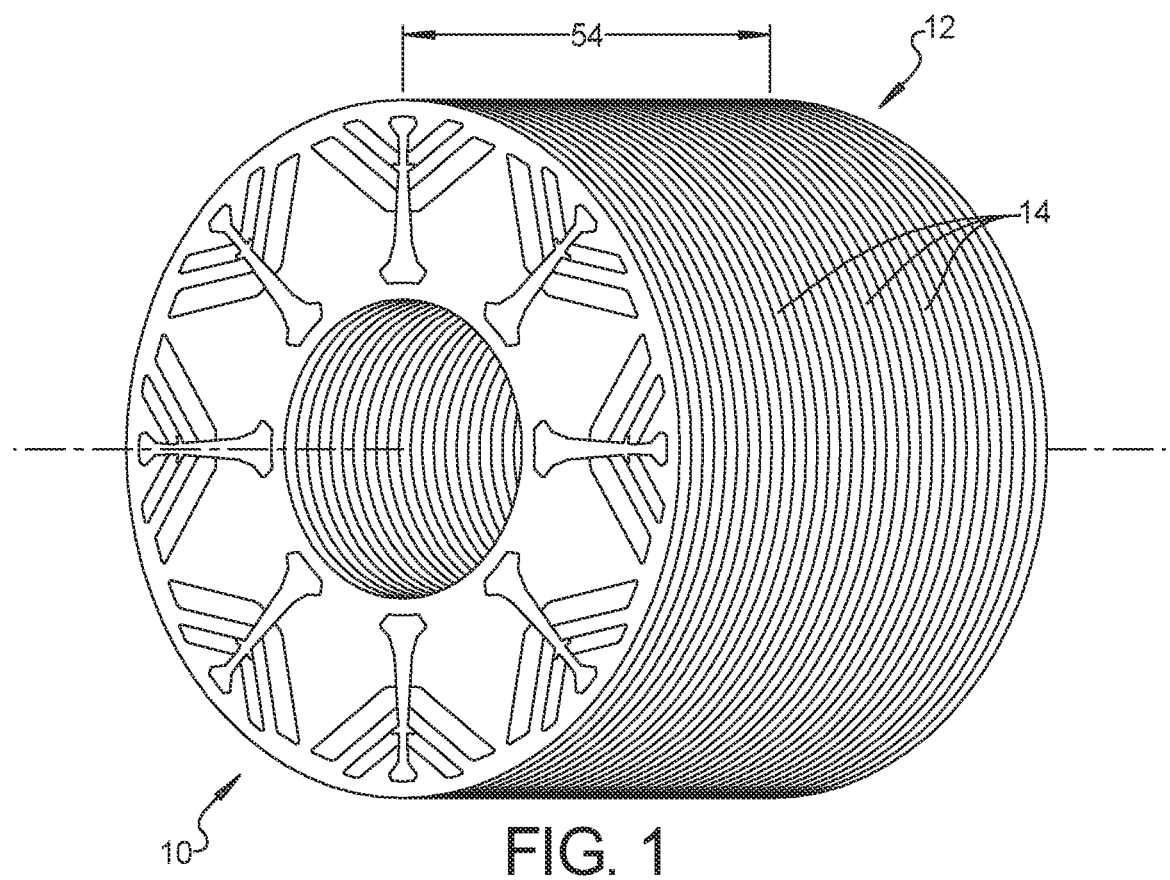
FIG. 1 is a perspective view of a core stack of a rotor core according to an exemplary embodiment of the present disclosure.

Referring to FIG. 1, a rotor core 10 for an electric machine of an automobile includes a core stack 12 including a plurality of identical lamination plates 14. The rotor core 12 is from an electric machine within an automobile, such as, but not limited to, a starter, an alternator, a starter/generator, or other electric motor. Each of the lamination plates 14 is manufactured from a ferrous material, such as but not limited to steel or non-orientated electrical steel. The lamination plates 14 are disposed adjacent each other along a central axis 16 to define the core stack 12.

Figure 2A:
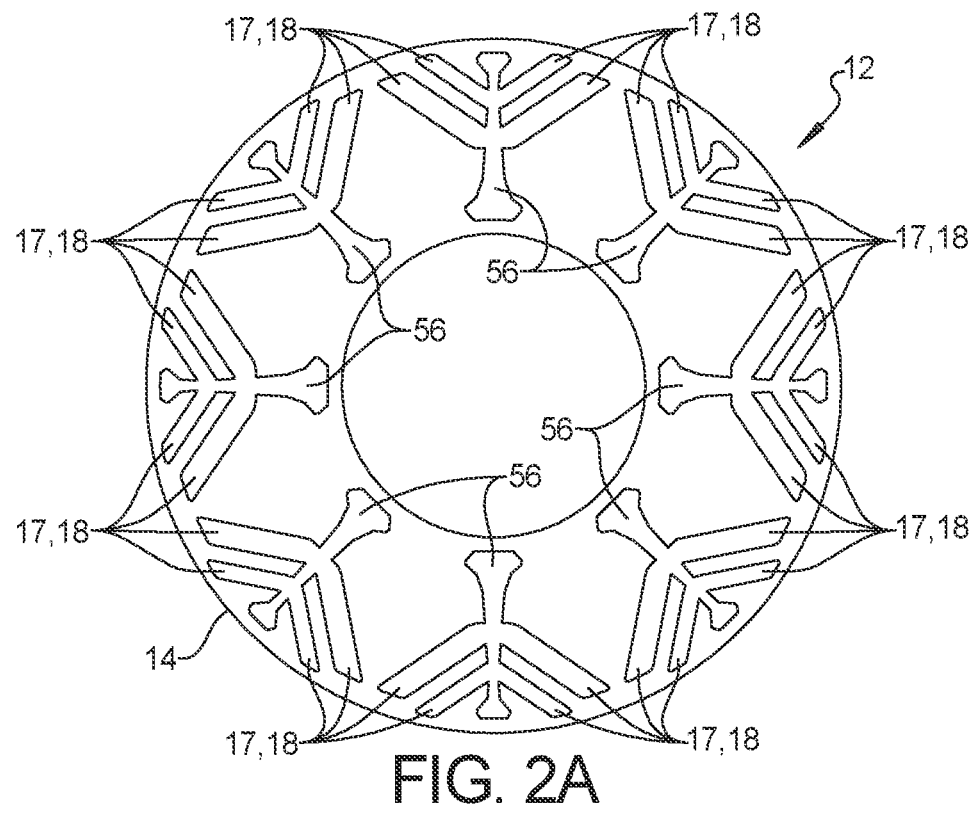
FIG. 2A is an end view of the core stack shown in FIG. 1, without an insert.

Referring to FIG. 2A, each of the lamination plates 14 includes a plurality of apertures 17 formed therein. The lamination plates 14 are aligned along the central axis 16 relative to one another such that the apertures 17 of each of the lamination plates 14 are axially aligned with the corresponding apertures 17 in adjacent lamination plates 14 to define a plurality of magnet slots 18. The magnet slots 18 extend axially through the core stack 12 parallel to the central axis 16. The magnet slots 18 are adapted to support a plurality of permanent magnets therein.

In the exemplary embodiment shown in FIG. 1 and FIG. 2A, the core stack 12 includes eight symmetrical groups of magnet slots 18 evenly spaced circumferentially around the core stack 12. Each group of magnet slots 18 includes four magnet slots 18 which are oriented in a V-shape. The magnet slots 18 of each group further define outer flux guides 20, middle flux guides 22 and inner flux guides 24. The outer, middle and inner flux guides 20, 22, 24 provide a path for electrical flux currents during operation of the rotor core 10.

Figure 2B:
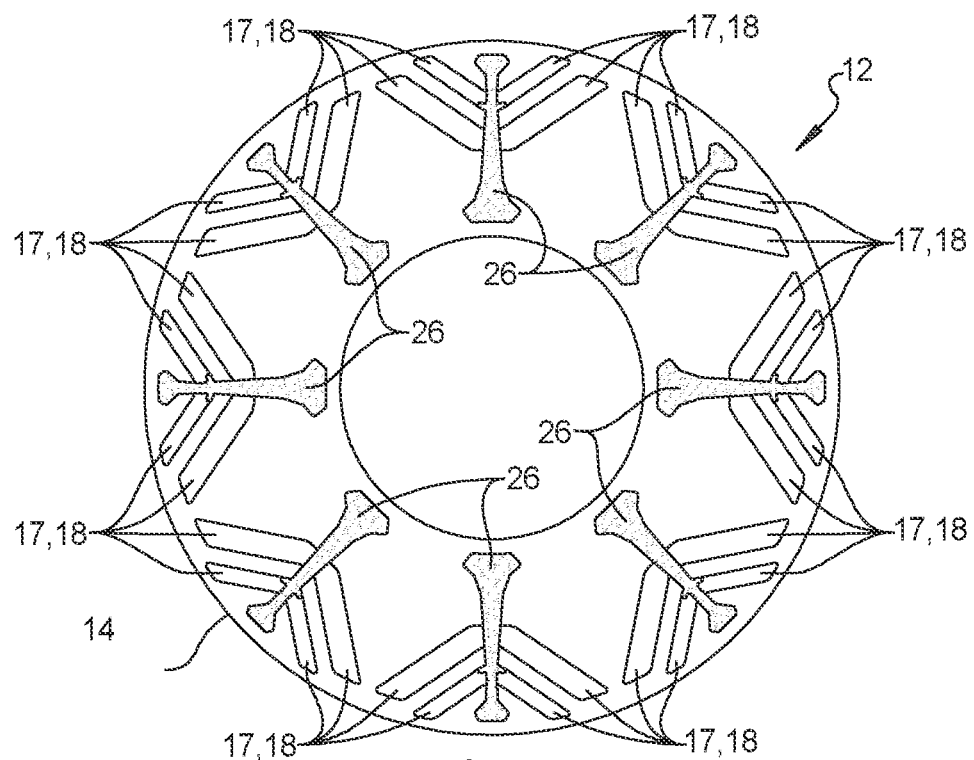
FIG. 2B is an end view of the core stack shown in FIG. 1, with an insert.

Referring to FIG. 1 and FIG. 2B, the core stack 12 includes at least one insert 26 extending axially through the core stack 12. The at least one insert 26 is adapted to provide radial structural stability to the plurality of lamination plates 14 to prevent portions of the plurality of lamination plates 14 adjacent the plurality of magnet slots 18 from flexing due to radial forces exerted on the plurality of lamination plates 14 during operation of the rotor core 10. More specifically, an insert 26 is associated with each of the groups of magnet slots 18. As shown, the core stack 12 includes eight inserts 26. The inserts 26 are adapted to provide support to the outer flux guides 20, the middle flux guides 22 and the inner flux guides 24 to prevent the outer flux guides, the middle flux guides and the inner flux guides 20, 22, 24 from flexing outward due to centrifugal forces as the rotor core 10 spins during operation.

Figure 2C:
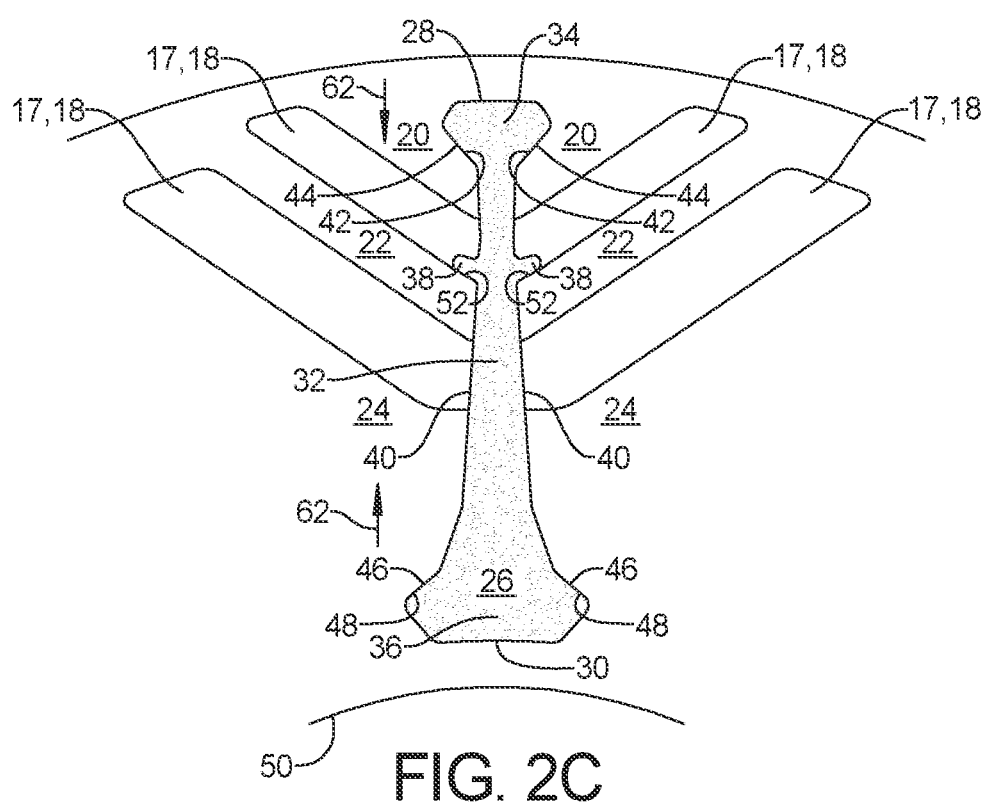
FIG. 2C is an enlarged view of a portion of FIG. 2B.
Figure 3A:
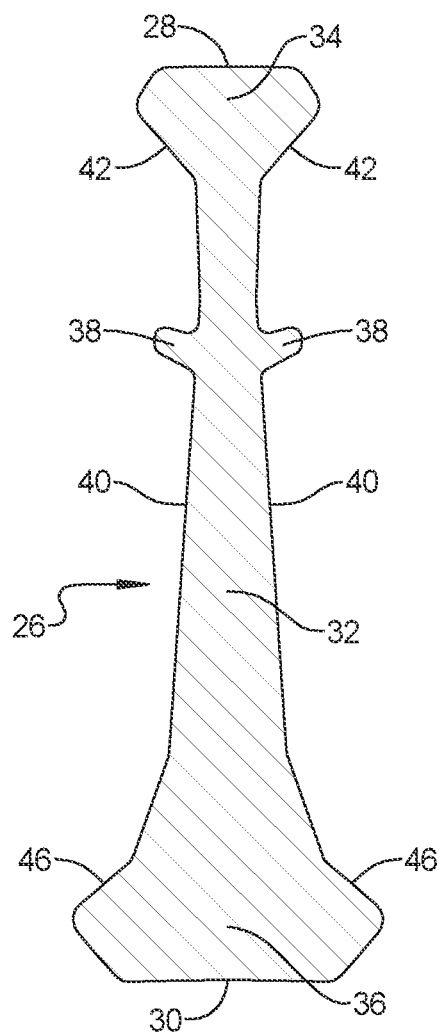
FIG. 3A is an end view of an insert according to an exemplary embodiment of the present disclosure.

Referring to FIG. 2C and FIG. 3A, each of the at least one insert 26 includes features adapted to engage radial outward portions of the plurality of lamination plates 14 adjacent the plurality of magnet slots 18. In the exemplary embodiment shown, each insert 26 includes a first distal end 28, a second distal end 30, and a body portion 32 extending between the first and second distal ends 28, 30. The first and second distal ends 28, 30 each include a flange portion 34, 36 that flares outward and nubs 38 that extend from sides 40 of the body portion 32. The flange portion 34 of the first distal end 28 includes radially inward facing surfaces 42 that engage radially outward facing portions 44 of the outer flux guides 20. The flange portion 36 of the second distal end 30 includes radially outward facing surfaces 46 that engage radially inward facing portions 48 of the lamination plates 14 near an inner diameter 50 of the core stack 12. The nubs 38 extend circumferentially outward from the body portion 32 of the insert 26 and engage radially outward facing surfaces 52 of the middle flux guides 22.

Figure 3B:
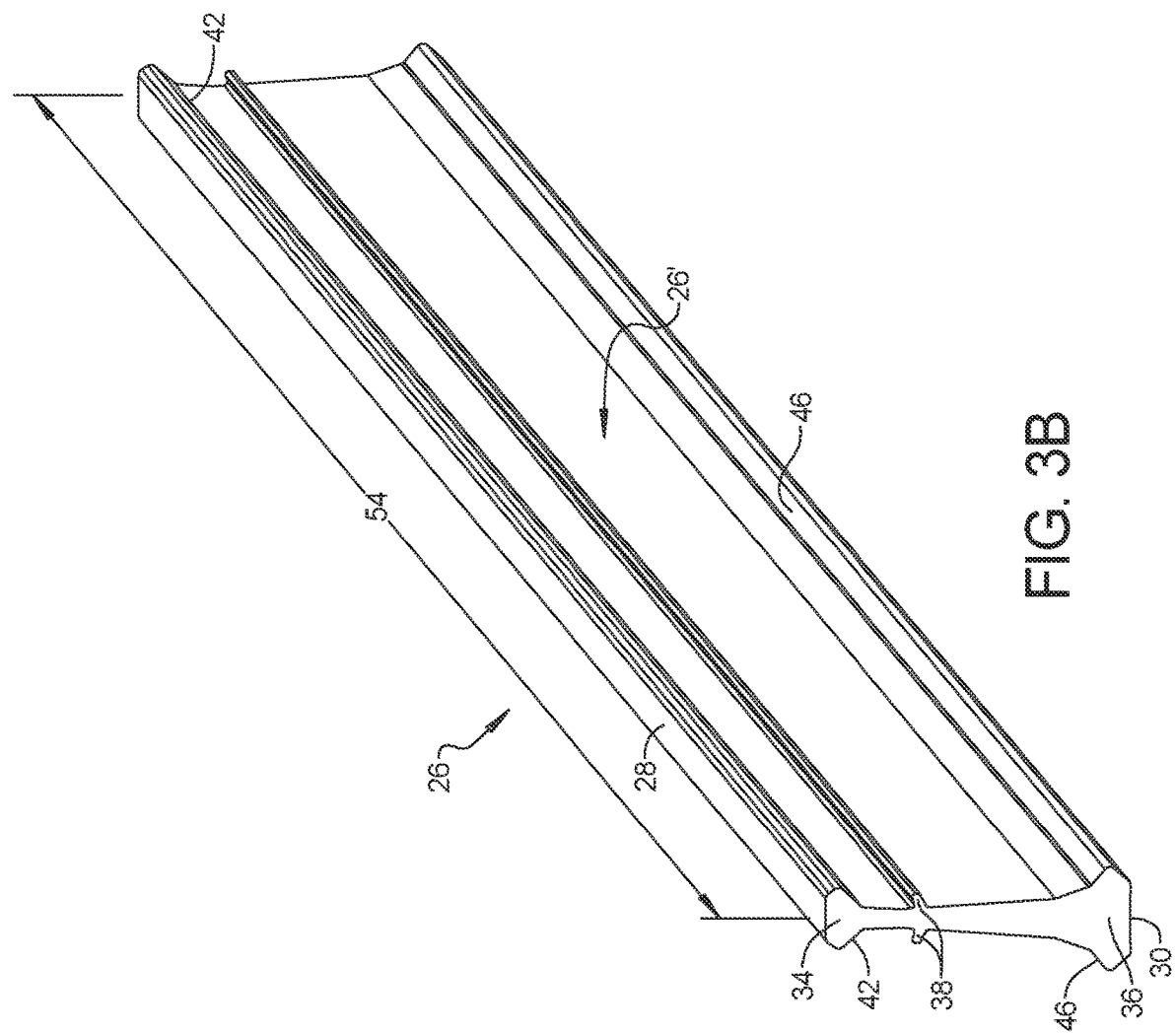
FIG. 3B is a perspective view of a single piece insert according to an exemplary embodiment.
Figure 5:
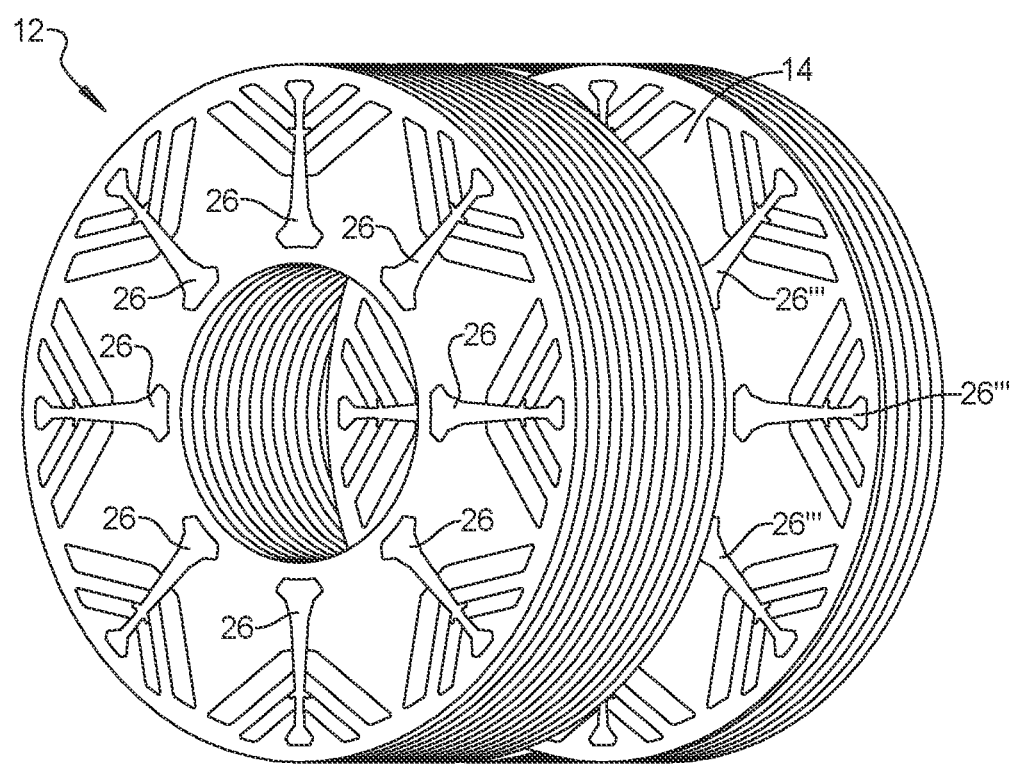
FIG. 5 is a perspective view of a rotor stack with one lamination plate partially removed and including a beam slice of an insert according to another exemplary embodiment.

Referring to FIG. 3B, in one exemplary embodiment, each of the inserts 26 comprises a single beam 26' extending axially along an entire length 54 of the core stack 12. Referring to FIG. 4, in another exemplary embodiment, each insert 26 comprises a plurality of beam segments 26" axially aligned and extending axially along an entire length 54 of the core stack 12. As shown, the insert 26 includes three beam segments 26". Each of the beam segments 26" extends through a portion of the plurality of lamination plates 14 and when inserted within the core stack 12, end to end, extend axially through the entire length 54 of the core stack 12. Referring to FIG. 5, wherein one of the lamination plates 14 is shown partially removed from the core stack 12, in another exemplary embodiment, each insert 26 comprises a plurality of beam slices 26''' axially aligned and extending axially along the entire length 54 of the core stack 12. Each individual beam slice 26''' is approximately the same thickness as one lamination plate 14. One beam slice 26''' of each insert 26 is positioned within each lamination plate 14. When the lamination plates 14 are axially aligned along the central axis 16 of the core stack 12, the individual beam slices 26''' line up to form the inserts 26. As shown, each lamination plate 14 includes eight beam slices 26''' positioned therein. When the lamination plates 14 are axially aligned along the central axis 16 of the core stack 12, the individual beam slices 26''' line up to form eight inserts 26.

Referring again to FIG. 1, FIG. 2B and FIG. 2C, in an exemplary embodiment, each of the lamination plates 14 is a single piece and includes at least one radial slot 56. As shown, each lamination plate 14 includes eight radial slots 56. The lamination plates 14 are aligned along the central axis 16 relative to one another such that the radial slots 56 of each of the lamination plates 14 are axially aligned with the corresponding radial slots 56 in adjacent lamination plates 14, and the inserts 26 are positioned therein.

As shown in FIG. 1, FIG. 2B and FIG. 2C, the inserts 26 extend radially between an outer diameter 58 of the core stack 12 and the inner diameter 50 of the core stack 12. The first distal end 28 of each insert 26 does not extend all the way outward to the outer diameter 58 of the core stack 12, and the second distal end 30 of each insert 26 does not extend all the way inward to the inner diameter 50 of the core stack 12.

Figure 6A:
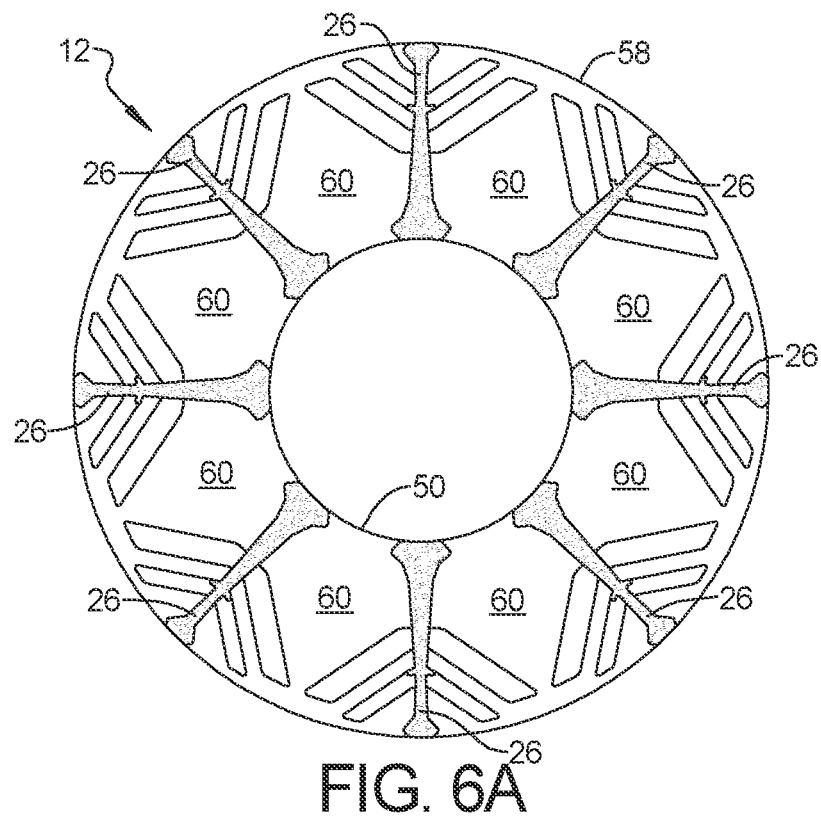
FIG. 6A is an end view of a rotor core having inserts that extend from an inner diameter of the core stack to an outer diameter of the core stack according to another exemplary embodiment.

Referring to FIG. 6A, in another exemplary embodiment, each of the inserts 26 extends radially between the inner diameter 50 of the core stack 12 and the outer diameter 58 of the core stack 12. The first distal end 28 of each insert 26 extends all the way out to the outer diameter 58 of the core stack 12, and the second distal end 30 of each insert 26 extends all the way inward to the inner diameter 50 of the core stack 12. Each of the plurality of lamination plates 14 comprises a plurality of pie shaped radial segments 60 positioned between adjacent pairs of the inserts 26.

Figure 6B:
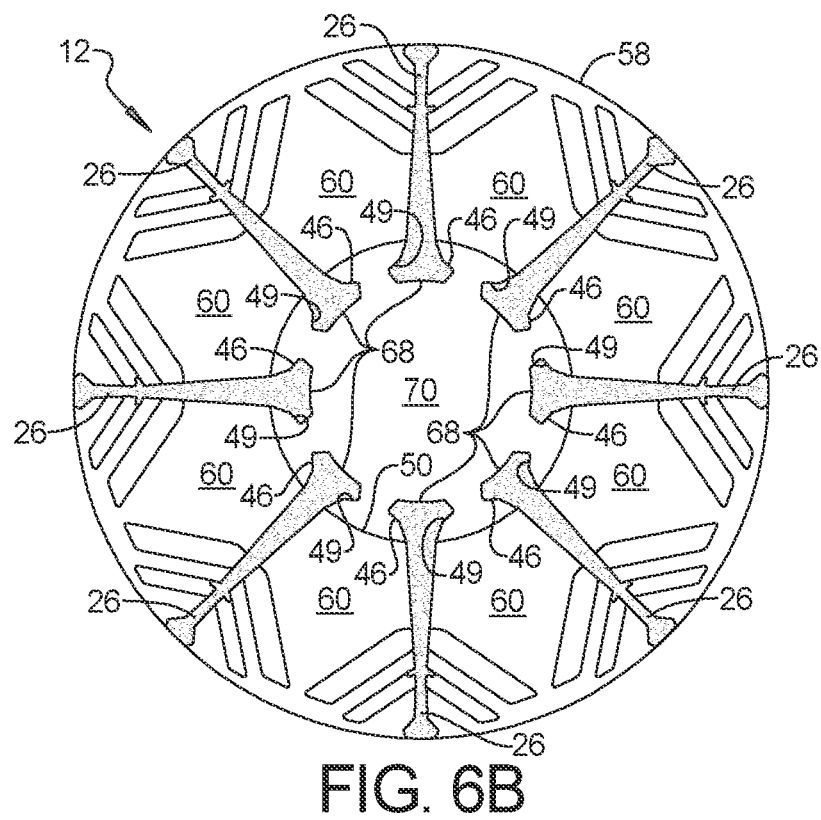
FIG. 6B is an end view of a rotor core having inserts that extend from an outer diameter of the core stack inwardly and engage slots formed within a rotor shaft.

Referring to FIG. 6B, in another exemplary embodiment, each of the inserts 26 extends radially between the inner diameter 50 of the core stack 12 and the outer diameter 58 of the core stack 12. The first distal end 28 of each insert 26 extends all the way out to the outer diameter 58 of the core stack 12, and the second distal end 30 of each insert 26 extends inward of the inner diameter 50 of the core stack 12. The flange portion 36 of the second distal end 30 of each insert 26 is received within a slot 68 formed within a rotor shaft 70 extending axially through the core stack 12. The flange portion 36 of the second distal end 30 includes radially outward facing surfaces 46 that engage radially inward facing portions 49 of the rotor shaft 70. Each of the plurality of lamination plates 14 comprises a plurality of pie shaped radial segments 60 positioned between adjacent pairs of the inserts 26.

In another exemplary embodiment, each of the inserts 26 is adapted to provide a compressive pre-load onto the core stack 12 to act against radial forces experienced by portions of the plurality of lamination plates 14 adjacent the plurality of magnet slots 18 during operation of the rotor core 10. The compressive pre-load will induce a compressive force onto the core stack 12, as indicated by arrows 62 in FIG. 2C. In one example, each of the inserts 26 is press fit within the plurality of lamination plates 14. The dimensions of each of the inserts 26 are such that when the inserts 26 are positioned within the lamination plates 14 of the core stack 12, the radially inward facing surfaces 42 of the first distal end 28 have a slight interference fit with the radially outward facing portions 44 of the outer flux guides 20. Similarly, the radially outward facing surfaces 46 of the second distal end 30 have a slight interference fit with the radially inward facing portions 48 of the lamination plates 14 near the inner diameter 50 of the core stack 12. When the inserts 26 are forced into the core stack 12, or when a beam slice 26''' of an insert 26 is forced into a lamination plate 14, these interference fit engagements results in the inserts 26 applying a compressive pre-load onto the lamination plates 14, as indicated by arrows 62 in FIG. 2C.

In another example, each of the inserts 26 is shrunk fit within the plurality of lamination plates 14. The dimensions of each of the inserts 26 are such that when the inserts 26 are positioned within the lamination plates 14 of the core stack 12, the radially inward facing surfaces 42 of the first distal end 28 have a slight interference fit with the radially outward facing portions 44 of the outer flux guides 20. Similarly, the radially outward facing surfaces 46 of the second distal end 30 have a slight interference fit with the radially inward facing portions 48 of the lamination plates 14 near the inner diameter 50 of the core stack 12. The inserts 26 and the core stack 12 or the beam slices 26''' and the lamination plates 14 are heated to controlled temperatures. Thermal expansion characteristics of the inserts 26 and the lamination plates 14 results in the ability to easily position the inserts 26 within the core stack 12 when the core stack 12 and the inserts 26 are strategically heated and cooled. Likewise, thermal expansion characteristics of the beam slices 26''' and the lamination plates 14 results in the ability to easily position the beam slices 26''' within the lamination plates 14 when the lamination plates 14 and the beam slices 26''' are strategically heated and cooled. As the materials cool, the interference fit engagements between the inserts 26 and the lamination plates 14 results in the inserts 26 applying a compressive pre-load onto the lamination plates 14 and the core stack 12, as indicated by arrows 62 in FIG. 2C.

Referring to FIGS. 3A and 3B, in an exemplary embodiment, each of the inserts 26 is made entirely from an austenitic or non-magnetic material. Anytime a ferrous or magnetic material interconnects two adjacent permanent magnets there is a loss of efficiency in the flux currents within the rotor core 10. An insert made entirely from a non-magnetic material prevents such losses and allows the rotor core 10 to be designed with smaller magnets, resulting is reduced costs. In another exemplary embodiment, each of the inserts 26 is made entirely from a high strength ferrous material. In this instance, the rotor assembly can spin at higher speeds with no increase in magnetic flux leakage.

Figure 7:
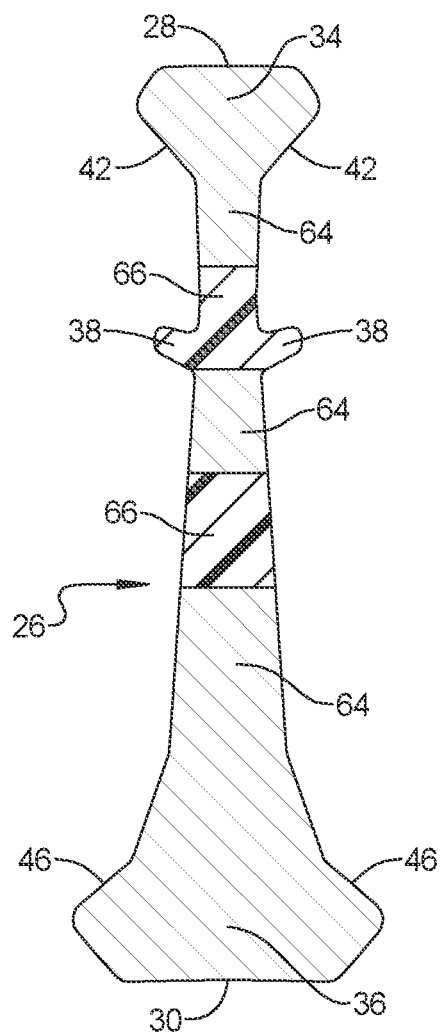
FIG. 7 is a sectional view of an insert having ferrous portions and austenitic portions according to another exemplary embodiment.
Figure 8:
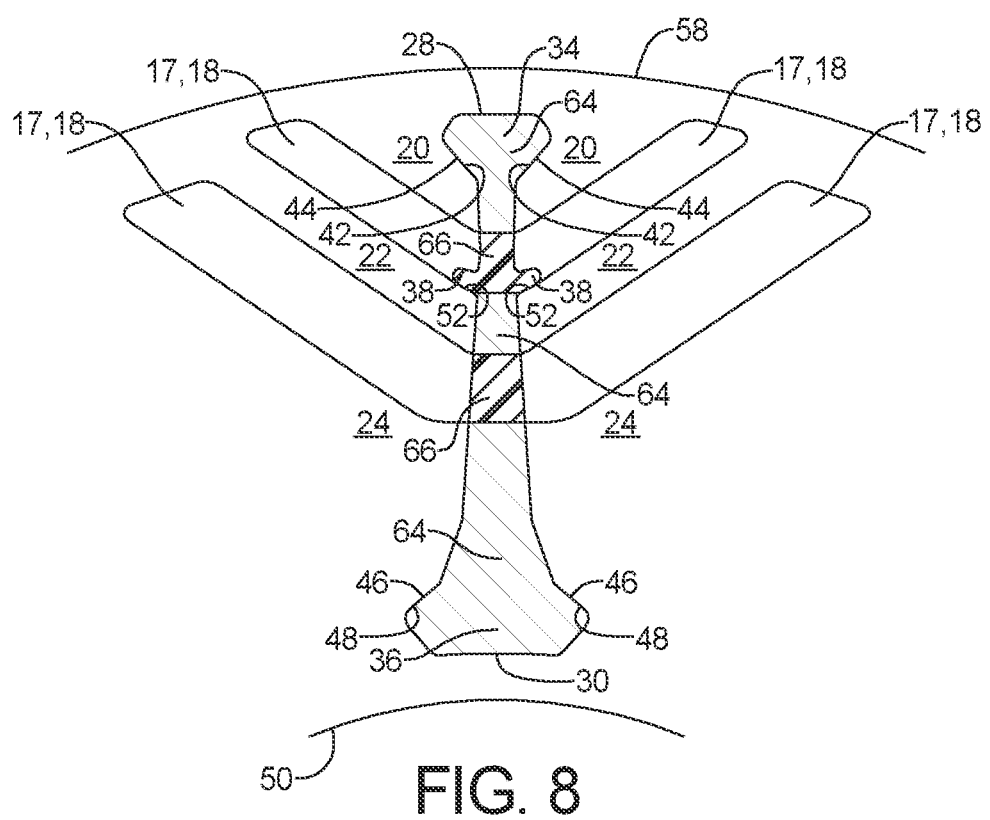
FIG. 8 is an enlarged view of a portion of a core stack having an insert as shown in FIG. 7.

Referring to FIG. 7 and FIG. 8, in another exemplary embodiment, each of the inserts 26 is formed from a bi-phase material. Each insert 26 includes portions 64 formed from a ferrous or magnetic material and portions 66 formed from an austenitic or non-magnetic material. The austenitic portions 66 of each of the inserts 26 are positioned between adjacent magnet slots 18 within the core stack 12 to avoid efficiency losses.

A rotor core of the present disclosure offers the advantage of providing a rotor core with structural integrity sufficient to withstand centrifugal forces during use of the electric machine without suffering reduced torque due to increased flux leakage caused by conventional methods of strengthening rotor cores. An electric machine utilizing a rotor core as disclosed herein can use smaller permanent magnets to provide motor torque equal to a rotor core using larger permanent magnets, thereby improving cost and packaging characteristics of the rotor core, or alternatively, an electric machine utilizing a rotor core as disclosed herein will exhibit increased motor torque, power and operating speed.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor core for an electric machine of an automobile, comprising:
    a core stack including a plurality of lamination plates;
    each lamination plate including a plurality of apertures formed therein, the plurality of apertures of each of the lamination plates axially aligned and defining a plurality of axial magnet slots extending through the core stack and adapted to support a plurality of permanent magnets therein; and
    at least one insert extending axially through the core stack and adapted to provide radial structural stability to the plurality of lamination plates to prevent portions of the plurality of lamination plates adjacent the plurality of magnet slots from flexing due to radial forces exerted on the plurality of lamination plates during operation of the electric motor, each of the at least one insert including portions formed from a ferrous material and portions formed from a non-ferrous material.

2. The rotor core of claim 1, wherein each of the at least one insert comprises a single beam extending axially along an entire length of the core stack.

3. The rotor core of claim 1, wherein each of the at least one insert comprises a plurality of beam segments axially aligned and extending axially along an entire length of the core stack, each beam segment extending through a portion of the plurality of lamination plates.

4. The rotor core of claim 1, wherein each of the at least one insert comprises a plurality of beam slices axially aligned and extending axially along an entire length of the core stack, one beam slice of each of the at least one insert positioned within each one of the plurality of lamination plates.

5. The rotor core of claim 1, wherein austenitic portions of each of the at least one insert are positioned between adjacent magnet slots within the core stack.

6. The rotor core of claim 1, wherein each of the at least one insert is formed entirely from a ferrous material.

7. The rotor core of claim 1, wherein each of the at least one insert is formed entirely from a non-ferrous material.

8. The rotor core of claim 1, wherein each of the at least one insert extends radially between an inner diameter of the core stack and an outer diameter of the core stack, each of the plurality of lamination plates comprising a plurality of pie shaped radial segments positioned between adjacent pairs of the at least one insert.

9. The rotor core of claim 8, wherein each of the at least one insert extends radially inward and engages a rotor shaft extending axially through the core stack.

10. The rotor core of claim 1, wherein each of the plurality of lamination plates is a single piece and includes at least one radial slot, one of the at least one insert being positioned within each one of the at least one radial slot.

11. The rotor core of claim 1, wherein each of the at least one insert is adapted to provide a compressive pre-load onto the core stack to act against radial forces experienced by portions of the plurality of lamination plates adjacent the plurality of magnet slots during operation of the rotor.

12. The rotor core of claim 11, wherein each of the at least one insert is one of press fit and shrink fit within the plurality of lamination plates.

13. The rotor core of claim 1, wherein each of the at least one insert includes features adapted to engage radial outward portions of the plurality of lamination plates adjacent the plurality of magnet slots to radial support the portions of the plurality of lamination plates adjacent the plurality of magnet slots during operation of the rotor.

14. A rotor core for an electric machine of an automobile, comprising:
a core stack including a plurality of lamination plates;
each lamination plate including a plurality of apertures formed therein, the plurality of apertures of each of the lamination plates axially aligned and defining a plurality of axial magnet slots extending through the core stack and adapted to support a plurality of permanent magnets therein;
at least one insert extending axially through the core stack and adapted to provide radial structural stability, and including features adapted to engage radial outward portions of the plurality of lamination plates adjacent the plurality of magnet slots to provide a compressive pre-load onto the core stack and to prevent portions of the plurality of lamination plates adjacent the plurality of magnet slots from flexing due to radial forces exerted on the plurality of lamination plates during operation of the electric motor each of the at least one insert including portions formed from a ferrous material and portions formed from a non-ferrous material.

15. The rotor core of claim 14, wherein each of the at least one insert comprises a single beam extending axially along an entire length of the core stack.

16. The rotor core of claim 14, wherein each of the at least one insert comprises a plurality of beam segments axially aligned and extending axially along an entire length of the core stack, each beam segment extending through a portion of the plurality of lamination plates.

17. The rotor core of claim 14, wherein each of the at least one insert comprises a plurality of beam slices axially aligned and extending axially along an entire length of the core stack, one beam slice positioned within each one of the plurality of lamination plates.

18. The rotor core of claim 14, wherein each of the at least one insert extends radially between an inner diameter of the core stack and an outer diameter of the core stack, each of the plurality of lamination plates comprising a plurality of pie shaped radial segments positioned between adjacent pairs of the at least one insert.

19. The rotor core of claim 14, wherein each of the plurality of lamination plates is a single piece and includes at least one radial slot, one of the at least one insert being positioned within each one of the at least one radial slot.

* * * * *